US012706746B2

(12) United States Patent
Cozma et al.

(10) Patent No.: US 12,706,746 B2
(45) Date of Patent: Aug. 11, 2026

(54) PREVENT BYPASSING AUTHENTICATION AND AUTHORIZATION CHECKS OF MICROSERVICES IN ZERO TRUST ARCHITECTURE

(71) Applicant: Lenovo Enterprise Solutions (Singapore) Pte. Ltd., New Tech Park (SG)

(72) Inventors: Alexandru Cozma, Bucharest (RO); Andreea-Denisa Minescu, Bucharest (RO); Tiberius-Ionut Hodoroaba-Simion, Bucharest (RO); Mihai-Alexandru Borbea, Bucharest (RO)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 50 days.

(21) Appl. No.: 18/772,611

(22) Filed: Jul. 15, 2024

(65) Prior Publication Data

US 2026/0019262 A1 Jan. 15, 2026

(51) Int. Cl.
*H04L 9/32* (2006.01)

(52) U.S. Cl.
CPC .......... *H04L 9/3213* (2013.01); *H04L 9/3271* (2013.01)

(58) Field of Classification Search
CPC ............................ H04L 9/3213; H04L 9/3271
See application file for complete search history.

(56) References Cited

U.S. PATENT DOCUMENTS

2019/0273746 A1* 9/2019 Coffing .................. G06Q 20/40
2022/0109741 A1* 4/2022 Chen ....................... H04L 69/40
2022/0224535 A1* 7/2022 Coffing ................ H04L 63/205

OTHER PUBLICATIONS

Meadows et al., "Sidecar-based Path-aware Security for Microservices", ACM Symposium on Access Control Models and Technologies (SACMAT '23) Jun. 7-9, 2023, pp. 1-6.
Rotlevi, "How to Implement Zero Trust: A Simplified Guide", Wiz Academy, Dec. 14, 2023, pp. 1-17.

* cited by examiner

*Primary Examiner* — Esther B. Henderson
(74) *Attorney, Agent, or Firm* — Kunzler Needham & Hilton; Bruce R. Needham

(57) ABSTRACT

A method for microservice authentication includes intercepting, at a first policy engine sidecar of a first microservice, a service request from the first microservice to a second microservice. The service request includes services requested from the second microservice. The method includes generating a transaction challenge, transmitting the service request, a first token identifying the first microservice, and the transaction challenge to the second microservice, and intercepting a service request response from the second microservice to the first microservice. The method includes determining whether the service request response includes a second token identifying the second microservice and a transaction challenge response generated by a second policy engine sidecar of the second microservice, and transmitting the service request response to the first microservice in response to determining the second token identifies the second microservice and determining that the transaction challenge response includes an acceptable transaction challenge response.

20 Claims, 13 Drawing Sheets

Central Policy Server
108

100

X
X

1st Service
102a

Transmit Request w/
Challenge, 1st Token

2nd Service
102b

1st Policy
Engine
Sidecar
104a

2nd Policy
Engine
Sidecar
104b

106a

106b

Central Policy Server
108

100

1st Service
102a

2nd Service
102b

Check AuthZ
Sign Challenge
Create Encrypted Transaction Obj.,
Check Authorization 1st Policy Engine Sidecar
104a 2nd Policy Engine Sidecar
104b 106a 106b Central Policy Server
108

100

X
X

1st Service
102a

2nd Service
102b

Transmit Response
(If Challenge Valid)

1st Policy
Engine
Sidecar
104a

2nd Policy
Engine
Sidecar
104b

106a

106b

PREVENT BYPASSING AUTHENTICATION AND AUTHORIZATION CHECKS OF MICROSERVICES IN ZERO TRUST ARCHITECTURE

FIELD

The subject matter disclosed herein relates to microservices and more particularly relates to microservice authentication in a zero trust architecture.

BACKGROUND

A microservice architecture is a system that arranges an application as a collection of loosely coupled, fine-grained services that communicate with each other via lightweight protocols. In a microservice architecture, each microservice may be deployed separately and independently. This independence is typically achieved by reducing dependencies between microservices, which allows developers to evolve services with limited restrictions from users. However, deployment of microservices creates security challenges.

BRIEF SUMMARY

A method for microservice authentication in a zero trust architecture is disclosed. An apparatus and computer program product also perform the functions of the method. The method includes intercepting, at a first policy engine sidecar of a first microservice, a service request from the first microservice to a second microservice. The service request includes services requested from the second microservice. The method includes generating, at the first policy engine sidecar, a transaction challenge, transmitting the service request, a first token identifying the first microservice, and the transaction challenge to the second microservice, and intercepting a service request response from the second microservice to the first microservice. The method includes determining whether the service request response includes a second token to identify the second microservice and a transaction challenge response generated by a second policy engine sidecar of the second microservice, and transmitting the service request response to the first microservice in response to determining that the second token identifies the second microservice and in response to determining that the transaction challenge response includes an acceptable response to the transaction challenge.

An apparatus for microservice authentication in a zero trust architecture includes a processor and non-transitory computer readable storage media storing code. The code is executable by the processor to perform operations that include intercepting, at a first policy engine sidecar of a first microservice, a service request from the first microservice to a second microservice. The service request includes services requested from the second microservice. The operations include generating, at the first policy engine sidecar, a transaction challenge, transmitting the service request, a first token identifying the first microservice, and the transaction challenge to the second microservice, intercepting a service request response from the second microservice to the first microservice, and determining whether the service request response includes a second token to identify the second microservice and a transaction challenge response generated by a second policy engine sidecar of the second microservice. The operations include transmitting the service request response to the first microservice in response to determining that the second token identifies the second microservice and in response to determining that the transaction challenge response includes an acceptable response to the transaction challenge.

A program product for microservice authentication in a zero trust architecture includes a non-transitory computer readable storage medium storing code. The code is configured to be executable by a processor to perform operations that include intercepting, at a first policy engine sidecar of a first microservice, a service request from the first microservice to a second microservice. The service request includes services requested from the second microservice. The operations include generating, at the first policy engine sidecar, a transaction challenge, transmitting the service request, a first token identifying the first microservice, and the transaction challenge to the second microservice, and intercepting a service request response from the second microservice to the first microservice. The operations include determining whether the service request response includes a second token to identify the second microservice and a transaction challenge response generated by a second policy engine sidecar of the second microservice, and transmitting the service request response to the first microservice in response to determining that the second token identifies the second microservice and in response to determining that the transaction challenge response includes an acceptable response to the transaction challenge.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
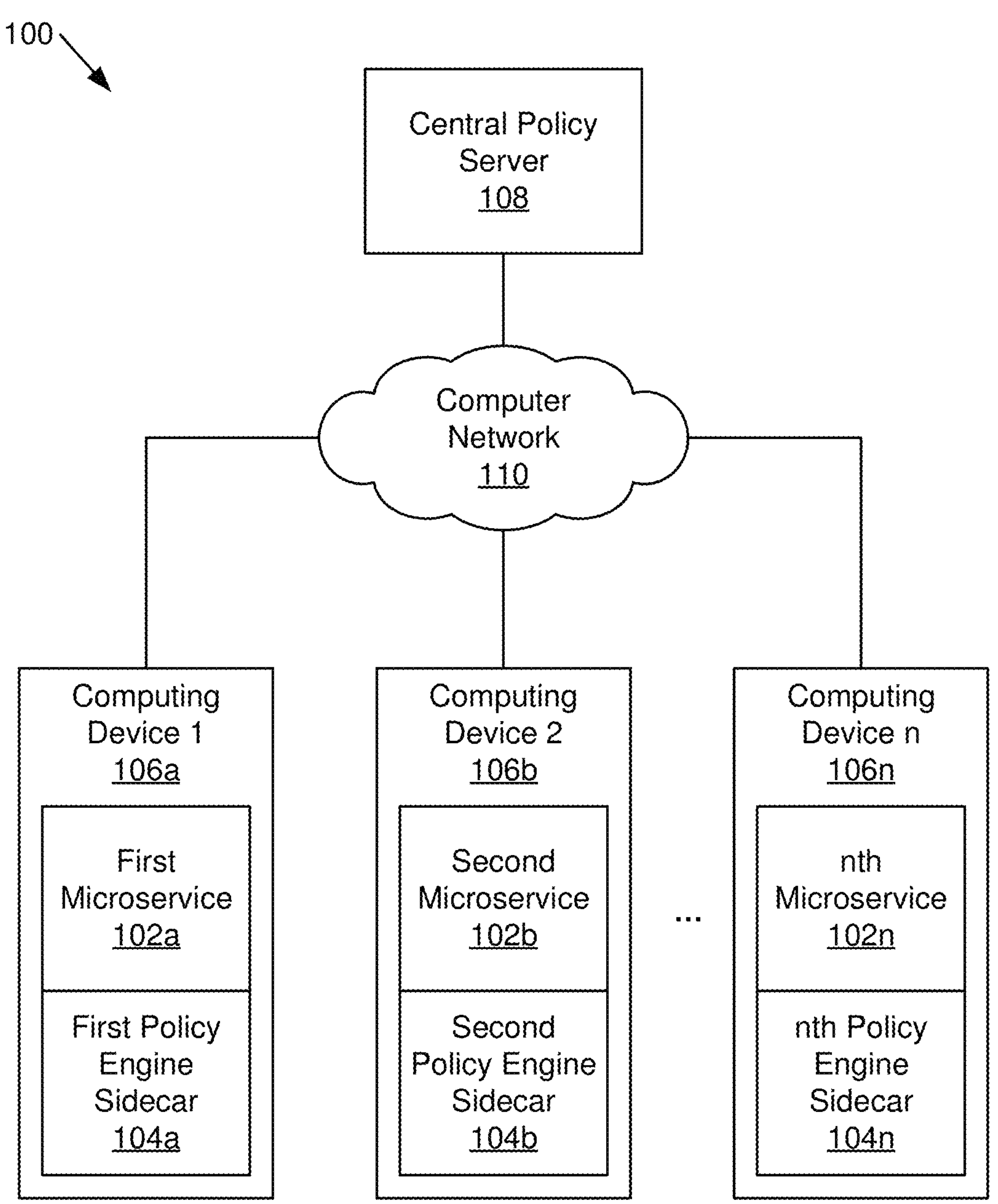
FIG. 1 is a schematic block diagram illustrating a system for microservice authentication in a zero trust architecture, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for microservice authentication in a zero trust architecture is disclosed. An apparatus and computer program product also perform the functions of the method. The method includes intercepting, at a first policy engine sidecar of a first microservice, a service request from the first microservice to a second microservice. The service request includes services requested from the second microservice. The method includes generating, at the first policy engine sidecar, a transaction challenge, transmitting the service request, a first token identifying the first microservice, and the transaction challenge to the second microservice, and intercepting a service request response from the second microservice to the first microservice. The method includes determining whether the service request response includes a second token to identify the second microservice and a transaction challenge response generated by a second policy engine sidecar of the second microservice, and transmitting the service request response to the first microservice in response to determining that the second token identifies the second microservice and in response to determining that the transaction challenge response includes an acceptable response to the transaction challenge.

In some embodiments, in response to receiving the service request from the first microservice, the second policy engine sidecar authenticates the first microservice using the first token and information received from a central policy server regarding the first microservice. In other embodiments, the second policy engine sidecar further determines whether the first microservice is authorized to request services of the service request using the information received from the central policy server regarding the first microservice. In other embodiments, determining whether the first microservice is authorized to request the services of the service request includes determining whether the first microservice has permission to access services provided by the second microservice.

In some embodiments, in response to receiving the service request response from the second microservice, the first policy engine sidecar authenticates the second microservice using the second token and information received from a central policy server regarding the second microservice. In other embodiments, the second policy engine sidecar generates the transaction challenge response in response to authenticating the first microservice using the first token. The transaction challenge response includes transaction details corresponding to the authentication of the first microservice by the second policy engine sidecar. In other embodiments, the method includes the first policy engine sidecar reporting a service request failure to the first microservice in response to determining that the second token is not valid, the service request response does not include a token from the second microservice, the transaction challenge response includes an unacceptable response to the transaction challenge, and/or the service request response does not include the transaction challenge response.

In some embodiments, the method includes registering a plurality of microservices with a central policy server. Registration of the plurality of microservices with the central policy server includes each of the plurality of microservices declaring services provided and permissions to use the services of the microservice where the first microservice and/or the second microservice are microservices of the plurality of microservices. In other embodiments, the central policy server further publishes the services of each of the plurality of microservices and permissions required by each of the plurality of microservices to each of the plurality of microservices. In other embodiments, an identifier provider of the central policy server establishes the first token at the first microservice and/or the second token at the second microservice. In other embodiments, the central policy server installs and/or communicates with the first policy engine sidecar and/or the second policy engine sidecar.

An apparatus for microservice authentication in a zero trust architecture includes a processor and non-transitory computer readable storage media storing code. The code is executable by the processor to perform operations that include intercepting, at a first policy engine sidecar of a first microservice, a service request from the first microservice to a second microservice. The service request includes services requested from the second microservice. The operations include generating, at the first policy engine sidecar, a transaction challenge, transmitting the service request, a first token identifying the first microservice, and the transaction challenge to the second microservice, intercepting a service request response from the second microservice to the first microservice, and determining whether the service request response includes a second token to identify the second microservice and a transaction challenge response generated by a second policy engine sidecar of the second microservice. The operations include transmitting the service request response to the first microservice in response to determining that the second token identifies the second microservice and in response to determining that the transaction challenge response includes an acceptable response to the transaction challenge.

In some embodiments, in response to receiving the service request from the first microservice, the second policy engine sidecar authenticates the first microservice using the first token and information received from a central policy server regarding the first microservice. In other embodiments, the second policy engine sidecar further determines whether the first microservice is authorized to request services of the service request using the information received from the central policy server regarding the first microservice. In other embodiments, determining whether the first microservice is authorized to request the services of the service request includes determining whether the first microservice has permission to access services provided by the second microservice. In other embodiments, in response to receiving the service request response from the second microservice, the first policy engine sidecar authenticates the second microservice using the second token and information received from a central policy server regarding the second microservice.

In some embodiments, the second policy engine sidecar generates the transaction challenge response in response to authenticating the first microservice using the first token. The transaction challenge response includes transaction details corresponding to the authentication of the first microservice by the second policy engine sidecar. In other embodiments, the operations further include the first policy engine sidecar reporting a service request failure to the first microservice in response to determining that the second token is not valid, the service request response does not include a token from the second microservice, the transaction challenge response includes an unacceptable response to the transaction challenge, and/or the service request response does not include the transaction challenge response.

In some embodiments, the operations include registering a plurality of microservices with a central policy server. Registration of the plurality of microservices with the central policy server includes each of the plurality of microservices declaring services provided and permissions to use the services of the microservice, where the first microservice and/or the second microservice are microservices of the plurality of microservices. In other embodiments, the central policy server further publishes the services of each of the plurality of microservices and permissions required by each of the plurality of microservices to each of the plurality of microservices. In other embodiments, an identifier provider of the central policy server establishes the first token at the first microservice and/or the second token at the second microservice. In other embodiments, the central policy server installs and/or communicates with the first policy engine sidecar and/or the second policy engine sidecar.

A program product for microservice authentication in a zero trust architecture includes a non-transitory computer readable storage medium storing code. The code is configured to be executable by a processor to perform operations that include intercepting, at a first policy engine sidecar of a first microservice, a service request from the first microservice to a second microservice. The service request includes services requested from the second microservice. The operations include generating, at the first policy engine sidecar, a transaction challenge, transmitting the service request, a first token identifying the first microservice, and the transaction challenge to the second microservice, and intercepting a service request response from the second microservice to the first microservice. The operations include determining whether the service request response includes a second token to identify the second microservice and a transaction challenge response generated by a second policy engine sidecar of the second microservice, and transmitting the service request response to the first microservice in response to determining that the second token identifies the second microservice and in response to determining that the transaction challenge response includes an acceptable response to the transaction challenge.

FIG. 1 is a schematic block diagram illustrating a system 100 for microservice authentication in a zero trust architecture, according to various embodiments. The system 100 includes microservices 102*a*-102*n* (generically or collectively "102") and policy engine sidecars 104*a*-104*n* (generally or collectively "104") and computing devices 106*a*-106*n* (generally or collectively "106) where each computing device (e.g. computing device 1 106*a*) includes a microservice (e.g., first microservice 102*a* and a policy engine sidecar (e.g. first policy engine sidecar 104*a*). The microservices 102, policy engine sidecars 104, and computing devices 106 are connected to a central policy server 108 and are connected via a computer network 110.

A microservice architecture is a system that arranges an application as a collection of loosely coupled, fine-grained services that communicate with each other via lightweight protocols. In a microservice architecture, each microservice 102 may be deployed separately. In a zero trust architecture, the idea is "never trust, always verify." Thus, in a transaction between two devices, both devices engage in security checks. For microservices 102 where each may be developed independently, requiring the developers to include security features and policies of a particular network is cumbersome. The system 100 provides policy engine sidecars 104 for each microservice 102 where each policy engine sidecar 104 is connected to a central policy server 108 over a computer network 110. The central policy server 108 allows microservices 102 to register where each microservice 102 has an instance of a policy engine sidecar 104 installed. During registration, a microservice 102 declares to the central policy server 108 the services provided by the microservice 102 and the permissions needed to access the provided services.

The central policy server 108 is able to communicate the services and permissions to each microservice 102, via the attached policy engine sidecar 104 or directly. The central policy server 108 also includes or utilizes an identity provider (also called an identity provider module below) that establishes a token for each microservice 102 that includes a unique identifier for each microservice 102. In some embodiments, the services and required permissions of a microservice 102 are correlated with the token of the microservice 102. In some embodiments, the central policy server 108 pushes the services and required permissions of a newly registered or altered microservice 102 to the various microservices 102 connected to the central policy server 108.

In some embodiments, the central policy server 108 and the policy engine sidecars 104 operate using role-based access control ("RBAC"). RBAC or role-based security is an approach to restricting access to authorized users. RBAC, in some embodiments, implements mandatory access control ("MAC") or discretionary access control ("DAC"). RBAC, in some embodiments, is a policy-neutral access control system defined around roles and privileges. Components of RBAC, such as role permissions, user-role, and role-role relationships lead to simple performance of user assignments. RBAC is used in some zero trust architectures.

In some embodiments, the central policy server 108 runs on a computing device. In various embodiments, the computing device may be a rack-mounted server, a desktop computer, a workstation, a mainframe computer, or the like. In some embodiments, the central policy server 108 runs in a cloud computing system and, in some embodiments, executes on a virtual machine.

In various embodiments, some or all of the computing devices 106 are separate physical computing devices. in other embodiments, some or all of the computing devices 106 are virtual machines. In other embodiments, the computing devices 106 are rack-mounted servers, are desktop computers, workstations, are mainframe computer, or the like. In various embodiments, some or all of the microservices 102 and associated policy engine sidecars 104 each execute on a separate computing device 106. In other embodiments, some or all of the microservices 102 and associated policy engine sidecars 104 are collocated on a computing device 106. For example, two microservices 102 and associated policy engine sidecars 104 execute on a single computing device 106. In some embodiments, some or all of the microservices 102 and associated policy engine sidecars 104 execute on a virtual machine. In some embodiments, some or all of the microservices 102 and associated policy engine sidecars 104 are available to one or more users via a cloud computing system and/or a proprietary computing system. While the microservices 102 and policy engine sidecars 104 are depicted in a single computing device 106, in other embodiments, the policy engine sidecars 104 are separate from the microservices 102 and the proximity of the microservices 102 and policy engine sidecars 104 are for convenience of depicting an association between a particular microservice 102 and a particular policy engine sidecar 104. One of skill in the art will recognize other places that the microservices 102 and associated policy engine sidecars 104 are executable.

The computer network 110, in some embodiments, includes a LAN, a WAN, a fiber network, a wireless connection, the Internet, or the like. In some embodiments, the computer network 110 includes two or more networks. In some embodiments, the computer network 110 includes servers, wiring, switches, routers, etc.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM" ®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

Figure 2A:
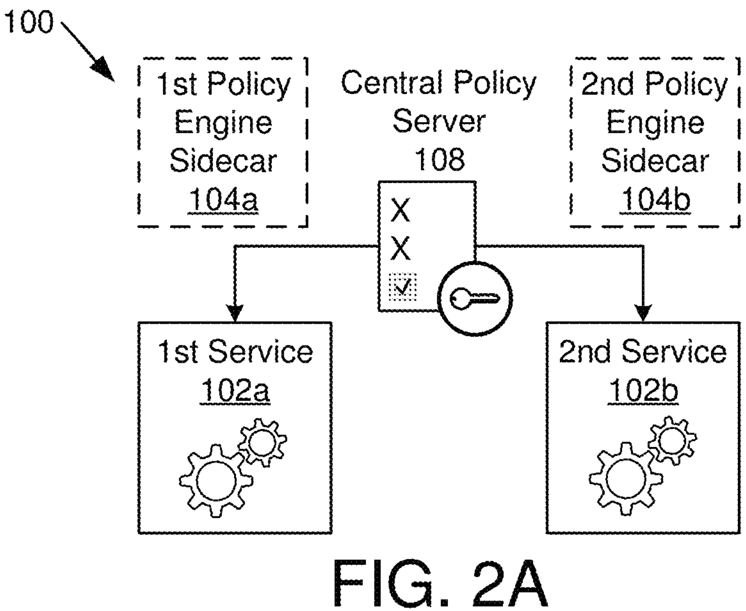
FIG. 2A is a schematic block diagram illustrating installing policy engine sidecars for microservices, according to various embodiments.
Figure 2B:
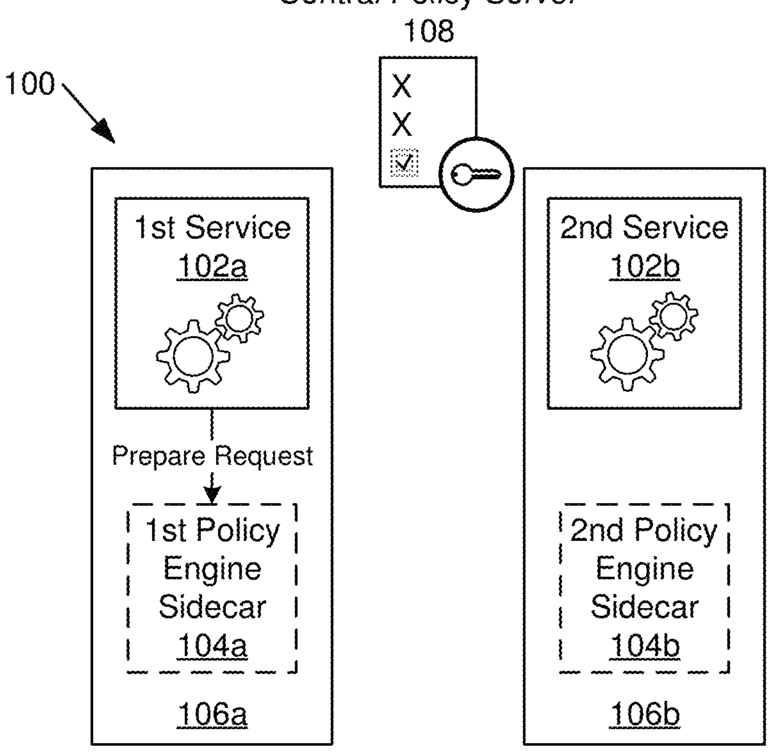
FIG. 2B is a schematic block diagram illustrating preparing, by a first microservice, a service request for a second microservice and a first policy engine sidecar intercepting the service request, according to various embodiments.
Figures 2C, 2D:
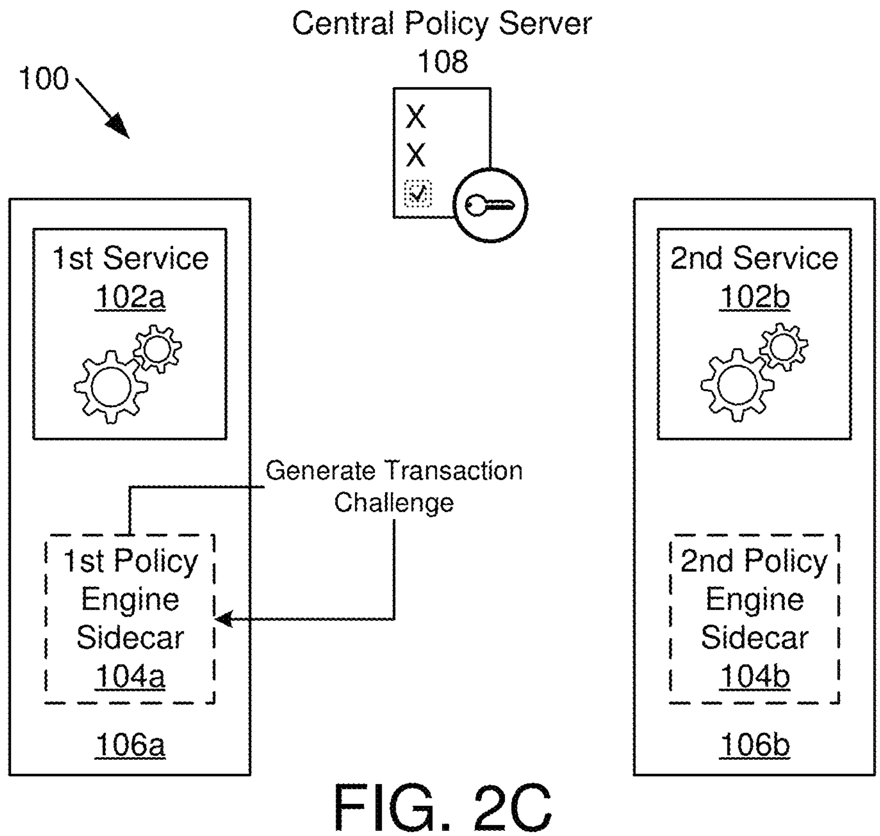
FIG. 2C is a schematic block diagram illustrating generating a transaction challenge by the first policy engine sidecar, according to various embodiments.
FIG. 2D is a schematic block diagram illustrating transmitting the service request with the transaction challenge and a first token from the first microservice to the second microservice, according to various embodiments.
Figures 2E, 2F:
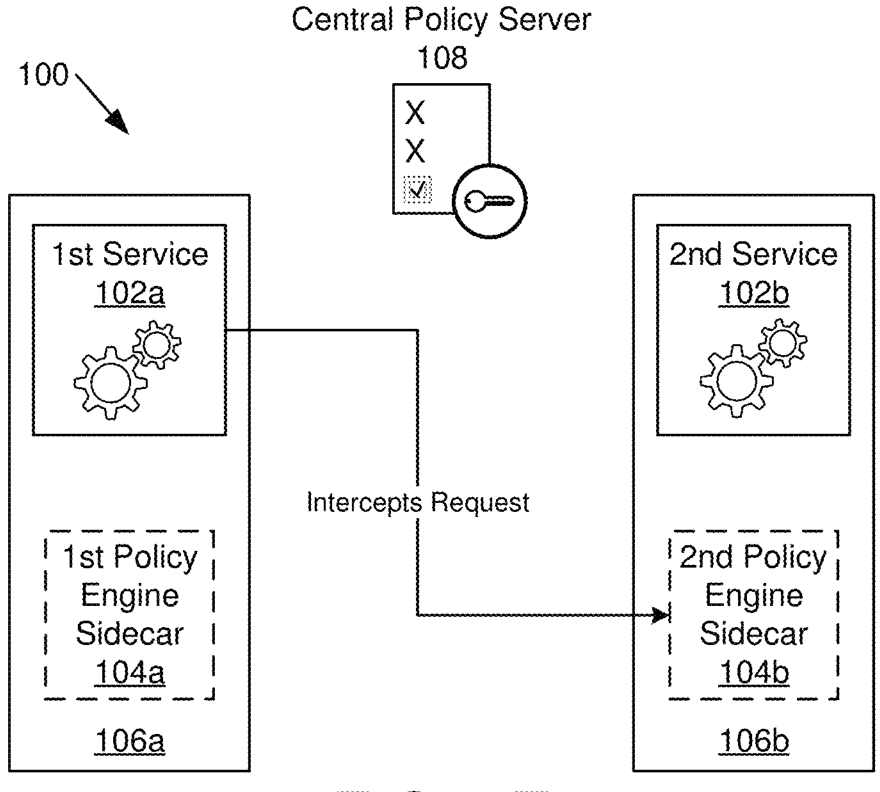
FIG. 2E is a schematic block diagram illustrating a second policy engine sidecar for the second microservice intercepting the service request, according to various embodiments.
FIG. 2F is a schematic block diagram illustrating the second policy engine sidecar doing an authorization check of the first microservice, signing the transaction challenge, creating an encrypted transaction object, and checking authorization of the first microservice, according to various embodiments.
Figure 2G:
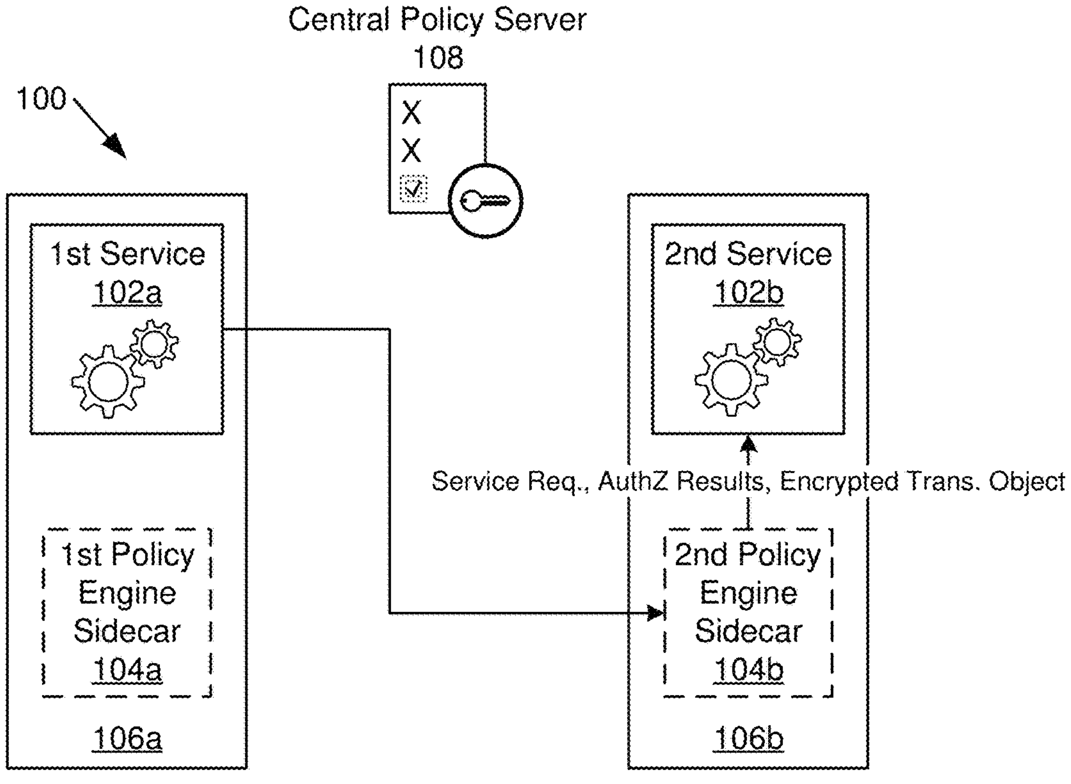
FIG. 2G is a schematic block diagram illustrating the second policy engine sidecar transmitting the service request, authorization results, and encrypted transaction object to the second microservice, according to various embodiments.
Figure 2H:
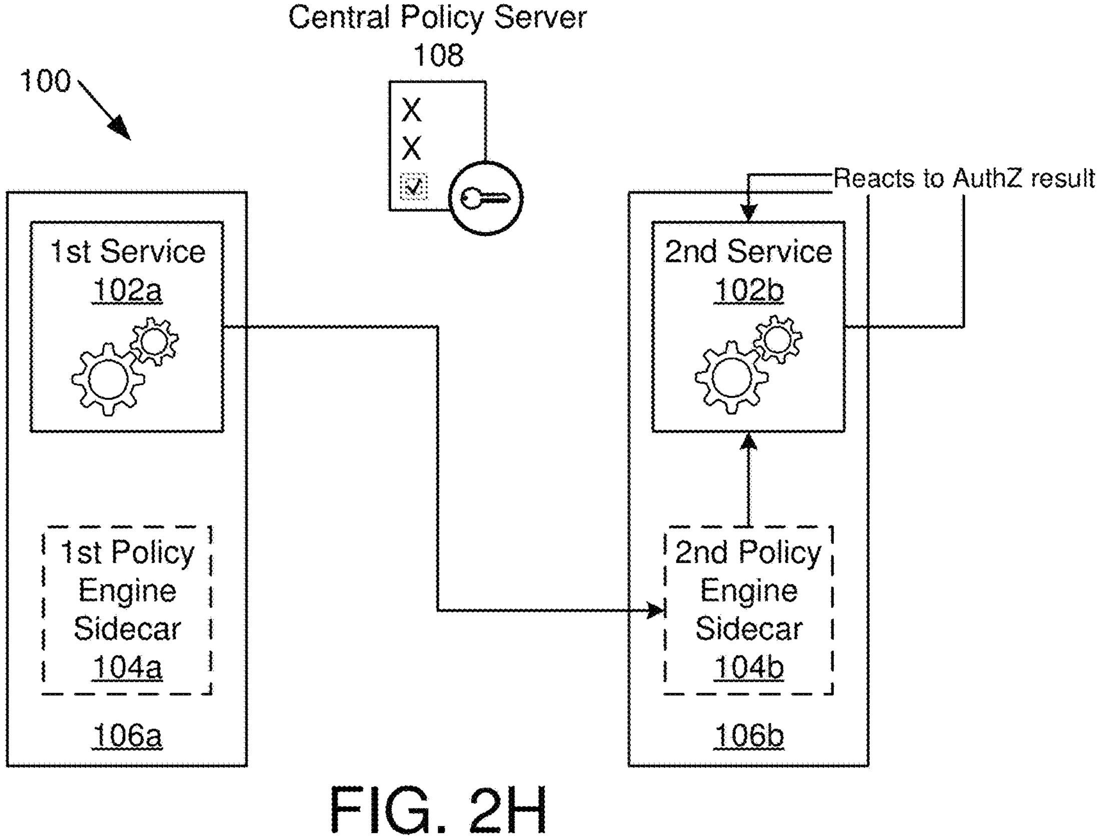
FIG. 2H is a schematic block diagram illustrating the second microservice responding to the service request by creating a service request response, according to various embodiments.
Figure 2I:
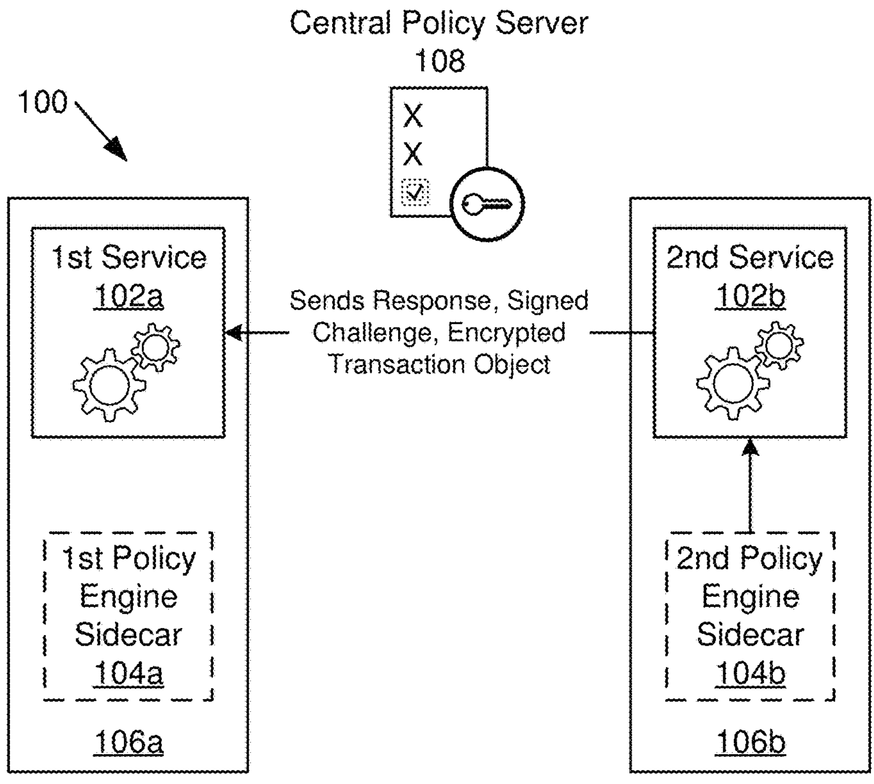
FIG. 2I is a schematic block diagram illustrating the second microservice transmitting the service request response, encrypted transaction object, and second token to the first microservice, according to various embodiments.
Figure 2J:
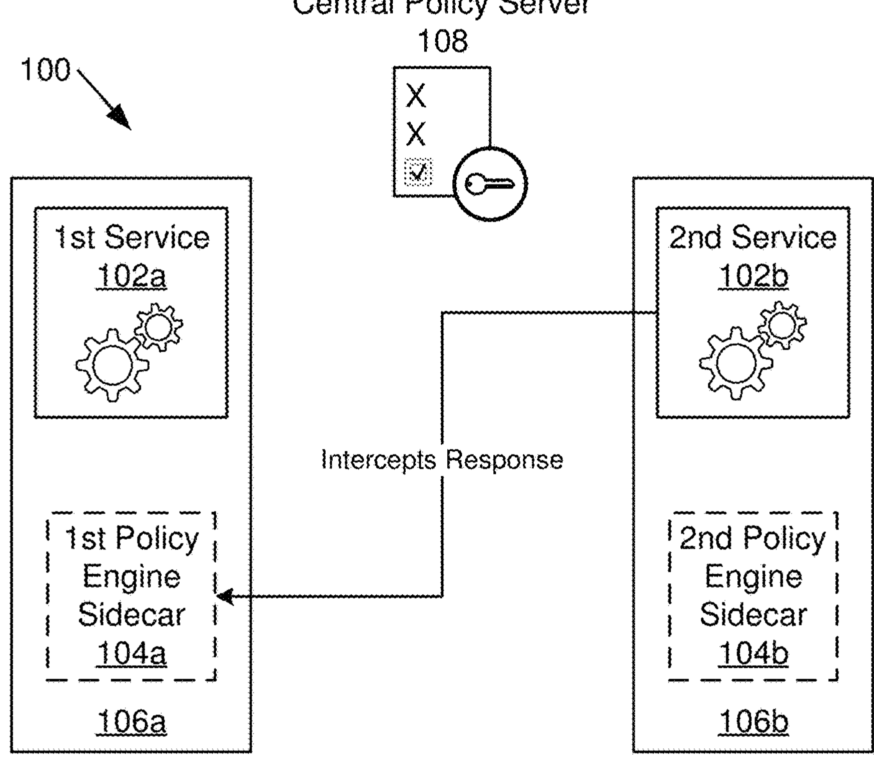
FIG. 2J is a schematic block diagram illustrating the first policy engine sidecar intercepting the service request response, according to various embodiments.
Figures 2K, 2L:
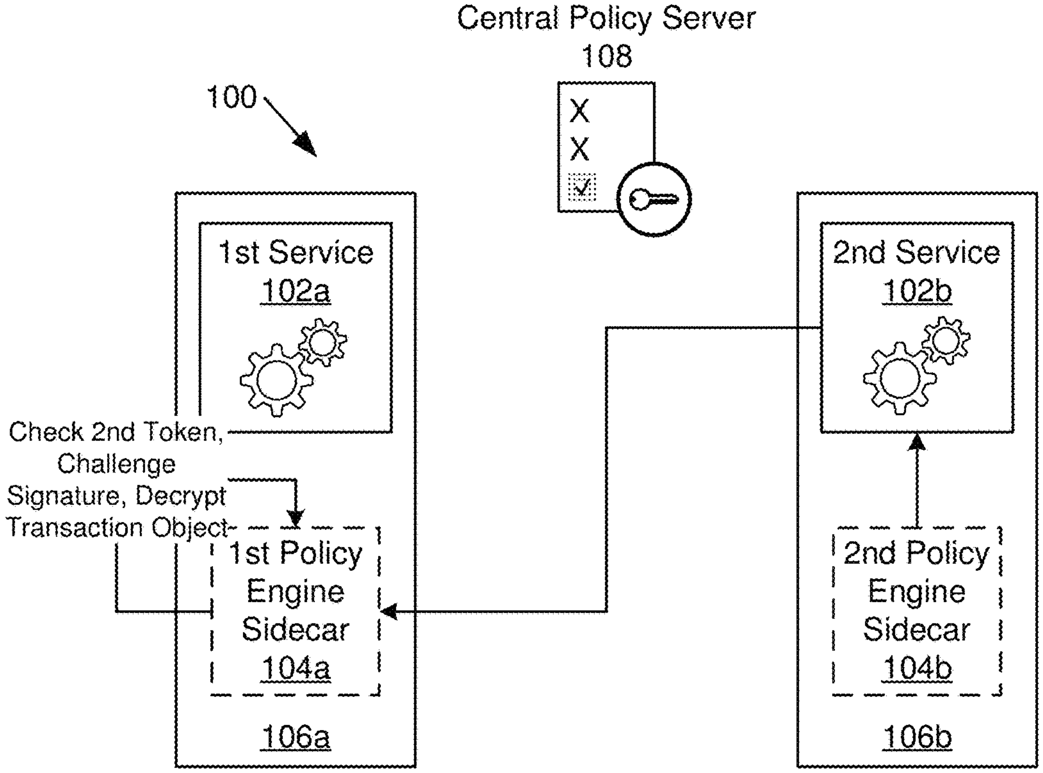
FIG. 2K is a schematic block diagram illustrating the first policy engine sidecar checking the validity of the second token and the transaction challenge, according to various embodiments.
FIG. 2L is a schematic block diagram illustrating the first policy engine sidecar transmitting the service request response to the first microservice in response to the first policy engine sidecar determining that the transaction challenge response is valid and/or that the second token is valid, according to various embodiments.
Figure 2M:
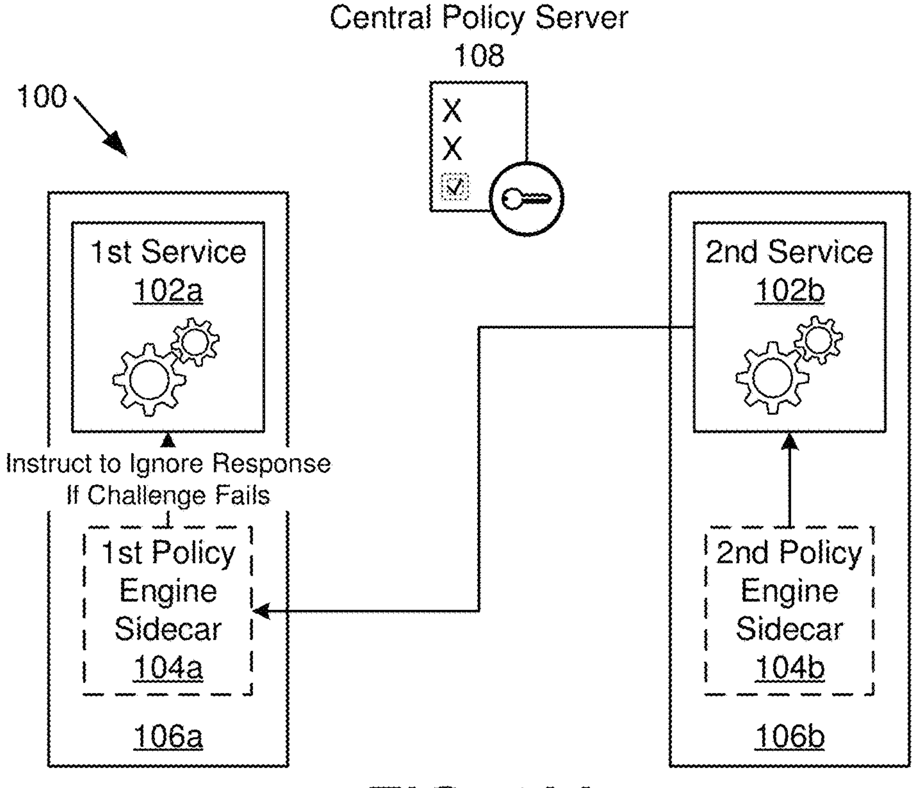
FIG. 2M is a schematic block diagram illustrating the first policy engine sidecar transmitting a notice to ignore the service request response where the second token is invalid or the encrypted transaction object is invalid, according to various embodiments.
Figure 2N:
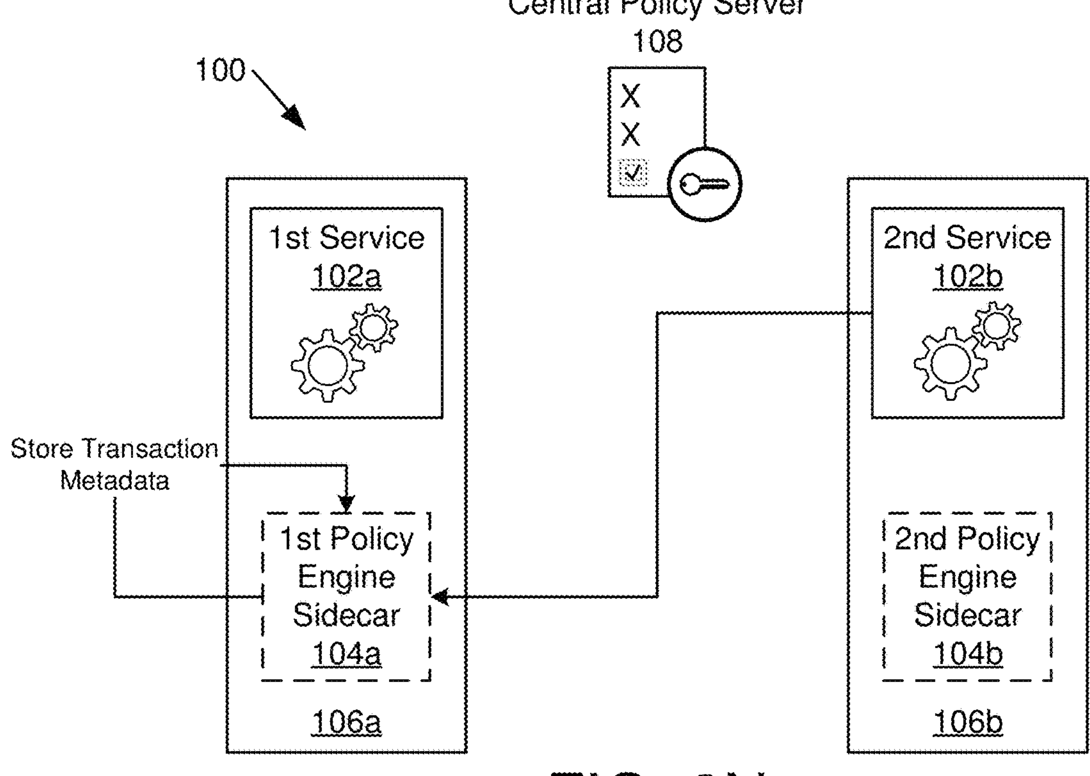
FIG. 2N is a schematic block diagram illustrating the first policy engine sidecar recording transaction metadata, according to various embodiments.

FIGS. 2A-2N illustrate an example of a first microservice 102*a* sending a service request to a second microservice 102*b* and a response to the service request by the second microservice 102*b*. The example may be generalized to any combination of microservices 102 and associated policy engine sidecars 104. FIG. 2A is a schematic block diagram illustrating installing policy engine sidecars 104 for microservices 102, according to various embodiments. In the embodiments, the central policy server 108 deploys code for the first and second policy engine sidecars 104*a*, 104*b* to be installed on the first and second microservices 102*a*, 102*b*. In some embodiments, the code is self-executing. In other embodiments, the code is executed by a user or execution is supervised by a user. In some embodiments, the first and second policy engine sidecars 104*a*, 104*b* are installed independent of the central policy server 108 and are configured with policy, tokens, etc. from the central policy server 108. In some embodiments, the central policy server 108 controls policy, tokens etc. of the policy engine sidecars 104 of registered microservices 102.

FIG. 2B is a schematic block diagram illustrating preparing, by a first microservice 102*a*, a service request for a second microservice 102*b* and a first policy engine sidecar 104*a* intercepting the service request, according to various embodiments. In some embodiments, the policy engine sidecars 104 are configured to intercept service requests from an associated microservice 102 to perform certain operations on the service request before transmission to a target microservice 102. The first policy engine sidecar 104*a*, in some embodiments, intercepts the service request from the first microservice 102*a* to add information related to a RBAC security policy.

FIG. 2C is a schematic block diagram illustrating generating a transaction challenge by the first policy engine sidecar 104*a*, according to various embodiments. In some embodiments, the transaction challenge is designed to track whether or not the second microservice 102*b* is actually verifying credentials of the first microservice 102*a*. In some embodiments, each microservice 102 includes a token that identifies the microservice 102. In some examples, the central policy server 108 works with an identity provider that establishes a token for each microservice 102 that includes a unique identifier for each microservice 102. In some embodiments, the unique identifier include a serial number, a media access control ("MAC") address, a random number, an internet protocol ("IP") address, or the like. In some embodiments, the identity provider refreshes or replaces the token of a microservice 102 on a periodic basis. In some embodiments, a token is encrypted and may be decrypted using a keyword, passcode, etc. known to a service, computing device, etc. that receives the token. For example, where the first microservice 102*a* and/or first policy engine sidecar 104*a* includes a first token and both the first and second microservices 102*a*, 102*b* are registered with a same central policy server 108, the second microservice 102*b* may use a key to decrypt the first token and access information about the first microservice 102*a* in the first token, such as a serial number, MAC address, etc. identifying the first microservice 102*a*.

In some embodiments, upon receipt of a service request from the first microservice 102*a*, the first policy engine sidecar 104*a* creates a challenge unique to the first microservice 102*a* and/or first policy engine sidecar 104*a*, which may involve the first token. In some embodiments, the transaction challenge include a timestamp, identifier, etc. so that when the first policy engine sidecar 104*a* receives a transaction challenge response, the first policy engine sidecar 104*a* is able to associate the transaction challenge response to the generated transaction challenge associated with the received service request. In some embodiments, the first policy engine sidecar 104*a* and/or first microservice 102*a* encrypt the transaction challenge, first token, and/or the service request.

FIG. 2D is a schematic block diagram illustrating transmitting the service request with the transaction challenge and a first token identifying the first microservice 102*a* to the second microservice 102*b*, according to various embodiments. Adding the first token and the transaction challenge to the service request provides information that allows the first and second policy engine sidecars 104*a*, 104*b* to authenticate a sending microservice 102 and to determine if the sending microservice 102 is authorized to request the services in the service request.

FIG. 2E is a schematic block diagram illustrating a second policy engine sidecar 104*b* for the second microservice 102*b* intercepting the service request, according to various embodiments. Each policy engine sidecar 104 is configured to intercept communications from other microservices 102 to authenticate the sending microservice 102 and to determine authorization for the service request received from the sending microservice 102.

FIG. 2F is a schematic block diagram illustrating the second policy engine sidecar 104*b* doing an authorization check of the first microservice 102*a*, signing the transaction challenge, creating an encrypted transaction object and checking authorization of the first microservice, according to various embodiments. In some embodiments, the second policy engine sidecar 104*b* uses a keyword or some other security key from the central policy server 108 to decrypt the service request, transaction challenge, and/or first token. The second policy engine sidecar 104*b* authorizes the first microservice 102*a* by determining if information in the first token, such as a MAC address, serial number, etc. matches information associated with the first microservice 102 from the central policy server 108. For example, where the first token includes a serial number for the first microservice 102*a*, the second policy engine sidecar 104*b* compares a serial number assigned to the first microservice 102*a* and received by the second policy engine sidecar 104*b* with the received serial number from the first token.

The second policy engine sidecar 104_b_, in some embodiments, signs the transaction challenge and/or creates an encrypted transaction object. The encrypted transaction object, in some embodiments, includes the signed transaction challenge that is encrypted. Signing the transaction challenge, in some embodiments, includes signing the transaction challenge in response to determining that information from the first token matches information linked to the first microservice 102_a_, thus authenticating the first microservice 102_a_. In some embodiments, signing the transaction challenge includes adding transaction details affirming that the second policy engine sidecar 104_b_ authorized the first microservice 102_a_. In other embodiments, the transaction challenge requires response to an inquiry, solving a problem, or other mechanism that requires work by the second policy engine sidecar 104_b_ that may then be used by the first policy engine sidecar 104_a_ to verify that the second policy engine sidecar 104_b_ responded correctly to the transaction challenge.

In some embodiments, the second policy engine sidecar 104_b_ checks authorization of the first microservice 102_a_ for the service request. In some embodiments, the second policy engine sidecar 104_b_ compares services requested in the service request with services that are provided by the second microservice 102_b_ to make sure that the second microservice 102_b_ is able to provide the requested services. In some embodiments, the second policy engine sidecar 104_b_ uses a table, library, data structure, etc. of services for various registered microservices 102 provided by the central policy server 108 to determine if the second microservice 102_b_ is capable of providing the requested services. In other embodiments, the second microservice 102_b_ provides the services provided by the second microservice 102_b_ to the second policy engine sidecar 104_b_.

In some embodiments, the second policy engine sidecar 104_b_ determines if the first microservice 102_a_ is permitted or authorized to request the services of the service request. In some embodiments, the second policy engine sidecar 104_b_ uses information from the central policy server 108, which may be in a table, library, database, etc. to determine if the first microservice 102_a_ is authorized to request the services in the service request.

FIG. 2G is a schematic block diagram illustrating the second policy engine sidecar 104_b_ transmitting the service request, authorization results, and encrypted transaction object to the second microservice 102_b_, according to various embodiments. In some embodiments, the second policy engine sidecar 104_b_ transmits the service request, authorization results, encrypted transaction object to the second microservice 102_b_ where the first microservice 102_a_ is authenticated and authorized for the services of the service request. In cases where the second policy engine sidecar 104_b_ determines that the first microservice 102_a_ has failed during the authorization check of the first token or the second policy engine sidecar 104_b_ determines that the services of the service request are not offered by the second microservice 102_b_ or that the first microservice 102_a_ is not authorized to request the services of the service request, the second policy engine sidecar 104_b_ does not send the service request, authorization results, and encrypted transaction object to the second microservice 102_b_ and/or reports the failures to the second microservice 102_b_ or ignores the service request. In some embodiments, the second policy engine sidecar 104_b_ records metadata associated with the authentication and authorization checks in a transaction record.

FIG. 2H is a schematic block diagram illustrating the second microservice 102_b_ responding to the service request by creating a service request response, according to various embodiments. In some embodiments, creating a service request response includes the second microservice 102_b_ providing the information requested in the service request and/or providing the service that was requested. In other embodiments, the second microservice 102_b_ is unable to provide the service requested so that the service request response includes information indicating that the service request was not fulfilled.

FIG. 2I is a schematic block diagram illustrating the second microservice 102_b_ transmitting the service request response, encrypted transaction object, and second token to the first microservice 102_a_, according to various embodiments. The service request response is generated by the second microservice 102_b_ while the encrypted transaction object is generated by the second policy engine sidecar 104_b_. The second token is a token that includes information identifying the second microservice 102_b_. The second token, in some embodiments, is similar to the first token but instead pertains to the second microservice 102_b_. In some embodiments, the second microservice 102_b_ provides the second token. In other embodiments, the second policy engine sidecar 104_b_ provides the second token. The second microservice 102_b_ provides the second token to allow the first microservice 102_a_ and/or the first policy engine sidecar 104_a_ to properly authenticate the second microservice 102_b_. In some embodiments, the service request response is encrypted. In other embodiments, the second token is encrypted. In other embodiments, the second token is not encrypted because the second token requires a key, password, etc. to access a serial number or other information about the second microservice 102_b_.

FIG. 2J is a schematic block diagram illustrating the first policy engine sidecar 104_a_ intercepting the service request response, according to various embodiments. The first policy engine sidecar 104_a_ is configured, in some embodiments, to intercept transmissions from other microservices 102 to provide authentication and authorization services. As such, a policy engine sidecar 104 helps to eliminate transmissions from malicious sources impersonating a microservice 102.

FIG. 2K is a schematic block diagram illustrating the first policy engine sidecar 104_a_ checking the validity of the second token and the transaction challenge, according to various embodiments. In some embodiments, the first policy engine sidecar 104_a_ does an authorization check of the second microservice 102_b_ by comparing information from the second token with stored information about the second microservice 102_b_. In some embodiments, the first policy engine sidecar 104_a_ checks the second token in the same way as the second policy engine sidecar 104_b_ checks the first token.

In some embodiments, the first policy engine sidecar 104_a_ decrypts the encrypted transaction object and evaluates the transaction challenge response. Evaluating the transaction challenge response, in some embodiments, includes determining if the second policy engine sidecar 104_b_ signed the transaction challenge. In other embodiments, evaluating the transaction challenge response includes reading transaction details to determine whether or not the second policy engine sidecar 104_b_ authenticated the first microservice 102_a_. In other embodiments, evaluating the transaction challenge response includes other checks, such as determining if the second policy engine sidecar 104*b* answered a question correctly, provided information requested in the transaction challenge, etc.

FIG. 2L is a schematic block diagram illustrating the first policy engine sidecar 104*a* transmitting the service request response to the first microservice 102*a* in response to the first policy engine sidecar 104*a* determining that the transaction challenge response is valid and/or the second token is valid, according to various embodiments. In some embodiments, the first policy engine sidecar 104*a* transmits the service request response only when the transaction challenge response is valid and the second token is valid. In other embodiments, the first policy engine sidecar 104*a* decrypts the service request response prior to transmission to the first microservice 102*a*.

FIG. 2M is a schematic block diagram illustrating the first policy engine sidecar 104*a* transmitting a notice to ignore the service request response where the second token is invalid or the encrypted transaction object is invalid, according to various embodiments. In other embodiments, the first policy engine sidecar 104*a* does not send a notice and instead does nothing if the second token is invalid or the transaction challenge response is invalid.

FIG. 2N is a schematic block diagram illustrating the first policy engine sidecar 104*a* recording transaction metadata, according to various embodiments. In some embodiments, the first policy engine sidecar 104*a* records metadata and/or other information regarding transmissions from other microservices 102 and whether or not a token from the sending microservice 102 was valid, whether or not a transaction challenge response was signed or not, etc. In other embodiments, the second policy engine sidecar 104*b* also records metadata and/or other information regarding various transactions.

Figure 3:
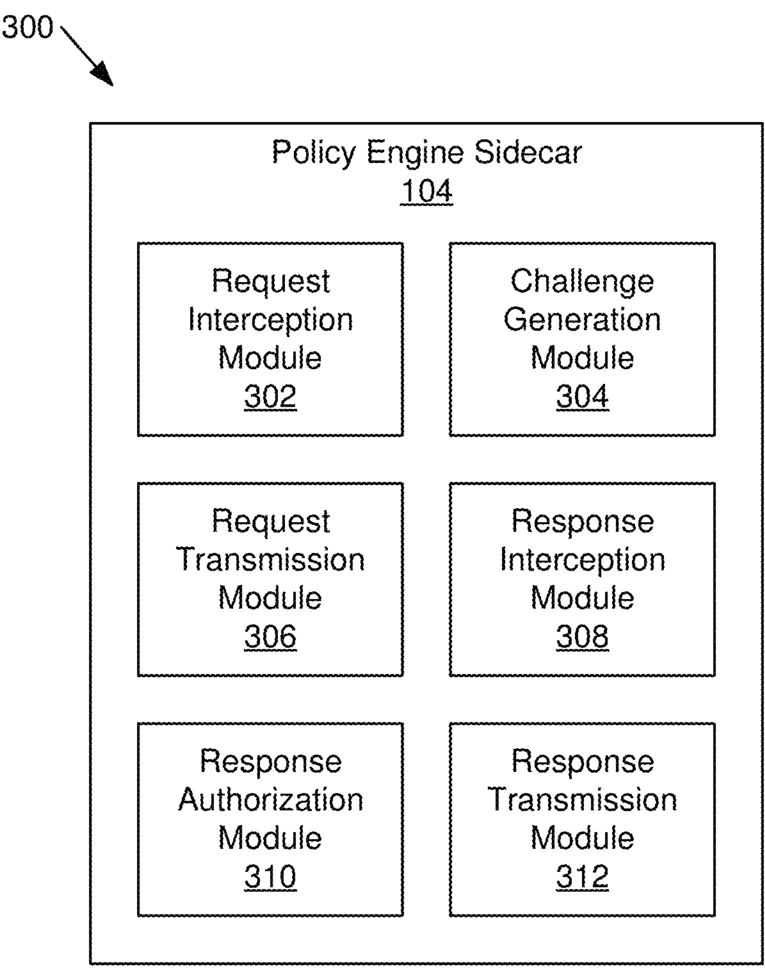
FIG. 3 is a schematic block diagram illustrating an apparatus for microservice authentication in a zero trust architecture, according to various embodiments.

FIG. 3 is a schematic block diagram illustrating an apparatus 300 for microservice authentication in a zero trust architecture, according to various embodiments. The apparatus 300 is for a policy engine sidecar 104 from the perspective of the policy engine sidecar 104 being coupled to a microservice 102 that initiates a service request. The policy engine sidecar 104 includes a request interception module 302, a challenge generation module 304, a request transmission module 306, a response interception module 308, a response authorization module 310, and a response transmission module 312, which are described below. In some embodiments, all or a portion the apparatus 300 is implemented using code that is executable by a processor where the code is stored on computer readable storage media. In other embodiments, all or a portion of the apparatus 300 is implemented using hardware circuits and/or a programmable storage device.

The apparatus 300 includes a request interception module 302 configured to intercept, at a first policy engine sidecar 104*a* of a first microservice 102*a*, a service request from the first microservice 102*a* to a second microservice 102*b*. In some embodiments, the service request includes a first token identifying the first microservice 102*a* and services requested from the second microservice 102*b*. In other embodiments, the first policy engine sidecar 104*a* has the first token. In some examples, the first policy engine sidecar 104*a* receives the first token from the central policy server 108 during a registration process for the first microservice 102*a*. A microservice architecture is a system that arranges an application as a collection of loosely coupled, fine-grained services that communicate with each other via lightweight protocols. Thus, a microservice 102 is an application and applications often access other applications to do portions of executing a workload that the application is not capable of doing. Thus, a microservice 102 often provides some function, mathematical result, specialized data, etc. based on execution of an application. Often it is more efficient for an application to call on other applications, which may be in the form of a microservice 102 to execute some subroutine, function, etc. rather than including code to perform the service provided by the microservice 102.

Accessing a microservice 102 is typically by way of a service request. In some embodiments, the service request includes data, numbers, parameters, or the like so that the microservice 102 being accessed provides a result or response that the requesting microservice (e.g., 102*a*) can use to further execution of a workload or to response to another service request. In other embodiments, the service request does not include data, numbers, etc. and requests a response that the microservice (e.g., 102*b*) is able to provide without input parameters, numbers, etc.

In some embodiments, the service request from the first microservice 102*a* is addressed to the second microservice 102*b* and the first policy engine sidecar 104*a* recognizes that the service request is directed externally and intercepts the service request. A policy engine sidecar 104 intercepting the service request provides a mechanism to handle authentication and authorization without those functions being written into the microservice 102.

The apparatus 300 includes a challenge generation module 304 configured to generate, at the first policy engine sidecar 104*a*, a transaction challenge. A transaction challenge, in some embodiments, is a mechanism designed to ensure that a policy engine sidecar (e.g., second policy engine sidecar 104*b*) of a microservice receiving a service request (e.g., the second microservice 102*b*) checks the credentials of the sending microservice (e.g., first microservice 102*a*). In some embodiments, the transaction challenge includes a token (e.g., first token) assigned to the sending microservice (e.g., first microservice 102*a*). In some embodiments, the token requires a key, a password, etc. to access contents of the token. The contents of the token include some identifier of the microservice 102 sending the service request (e.g., 102*a*) where the identifier could be a serial number, a MAC address, or the like. In other embodiments, a token provides other information in addition to an identifier of the microservice 102, such as an indication of which central policy server 108 the microservice 102 is registered, when the microservice 102 was registered, services provide by the microservice 102, or the like.

In some embodiments, the transaction challenge provides a query that is answered based on information provided by the central policy server 108. For example, the query may include a particular number, word, etc. and the second policy engine sidecar 104*b* includes a table with a specific answer correlated to the query. In other embodiments, the transaction challenge is simple query, a problem to be solved, or other question that requires a specific answer where the second policy engine sidecar 104*b* of the second microservice 102*b* providing a specific answer is indicative that the second microservice 102*b* is registered with the central policy server 108 and has not been hacked, tampered with, etc. One of skill in the art will recognize other appropriate transaction challenges where the second policy engine sidecar 104*b* provides an acceptable response to the transaction challenge.

The apparatus 300 includes a request transmission module 306 configured to transmit the service request, the first token, and the transaction challenge to the second microservice 102*b*. In some embodiments, the request transmission module 306 of the first policy engine sidecar 104*a* works in conjunction with the first microservice 102*a* to transmit the service request, the first token, and the transaction challenge to the second microservice 102*b*. In other embodiments, the request transmission module 306 transmits the service request, the first token, and the transaction challenge to the second microservice 102*b* from the first policy engine sidecar 104*a*. In some embodiments, the request transmission module 306 encrypts the service request, first token, and/or the transaction challenge prior to transmission to the second microservice 102*b*. In some embodiments, the request transmission module 306 uses a key from the identity provider of the central policy server 108 for encryption where the second policy engine sidecar 104*b* has a key for decryption.

The apparatus 300 includes a response interception module 308 configured to intercept a service request response from the second microservice 102*b* to the first microservice 102*a*. The service request response is in response to a service request from the first microservice 102*a*. Typically, for the second microservice 102*b* to send the service request response, the second policy engine sidecar 104*b* processes, authenticates the first microservice 102*a* and determines that the first microservice 102*a* is authorized to send the service request, as explained with regard to FIGS. 2E-2I. In other embodiments, the service request response may be from a hacked microservice, from a device impersonating a registered microservice, or the like. Thus, the first policy engine sidecar 104*a* includes a process for evaluating the service request response and the response interception module 308 intercepts the service request response.

The apparatus 300 includes a response authorization module 310 configured to determine whether the service request response includes a second token to identify the second microservice 102*b* and a transaction challenge response generated by a second policy engine sidecar 104*b* of the second microservice 102*b*. In some embodiments, the response authorization module 310 evaluates the second token to determine if the second token properly authenticates the second microservice 102*b*. In some embodiments, the response authorization module 310 uses a password, a key, etc. to decrypt, access, etc. the second token to evaluate contents of the second token. In some embodiments, the response authorization module 310 determines if contents of the second token include an identifier, such as a serial number, MAC address, etc. that matches information about the second microservice 102*b* received from the central policy server 108.

In some embodiments, the response authorization module 310 also evaluates the transaction challenge response to determine if the transaction challenge response is acceptable. In some embodiments, the transaction challenge response is encrypted as an encrypted transaction object and the response authorization module 310 decrypts the encrypted transaction object prior to evaluating the transaction challenge response. The response authorization module 310 includes a key, password, etc. to unlock properly encrypted transaction objects and where the response authorization module 310 is unable to decrypt the encrypted transaction object, the response authorization module 310 determines that the transaction challenge response is invalid.

The response authorization module 310 determines from the decrypted transaction challenge response whether or not the transaction challenge response is acceptable. In some embodiments, determining that the transaction challenge response is acceptable includes determining that the second policy engine sidecar 104*b* properly authenticated the first microservice 102*a*. In other embodiments, the response authorization module 310 determining that the transaction challenge response is valid includes determining if a proper response to a query of the transaction challenge is valid. For example, if the central policy server 108 transmits a table with values and table entry 5 includes a word, such as "bananas" and the challenge generation module 304 included a transaction challenge of the number 5 and the response authorization module 310 determines that that transaction challenge response is the word "bananas," the response authorization module 310 determines that that the transaction challenge response is valid.

The apparatus 300 includes a response transmission module 312 configured to transmit the service request response to the first microservice 102*a* in response to determining that the second token identifies the second microservice 102*b* and in response to determining that the transaction challenge response includes an acceptable response to the transaction challenge. In some embodiments, the response transmission module 312 decrypts the service request response prior to transmission to the first microservice 102*a*. In some embodiments, for the response transmission module 312 to transmit the service request response, the received service request response includes a second token that properly authenticates the second microservice 102*b* and includes a transaction challenge response that is acceptable. The first microservice 102*a* is then free to use information from the service request response.

Figure 4:
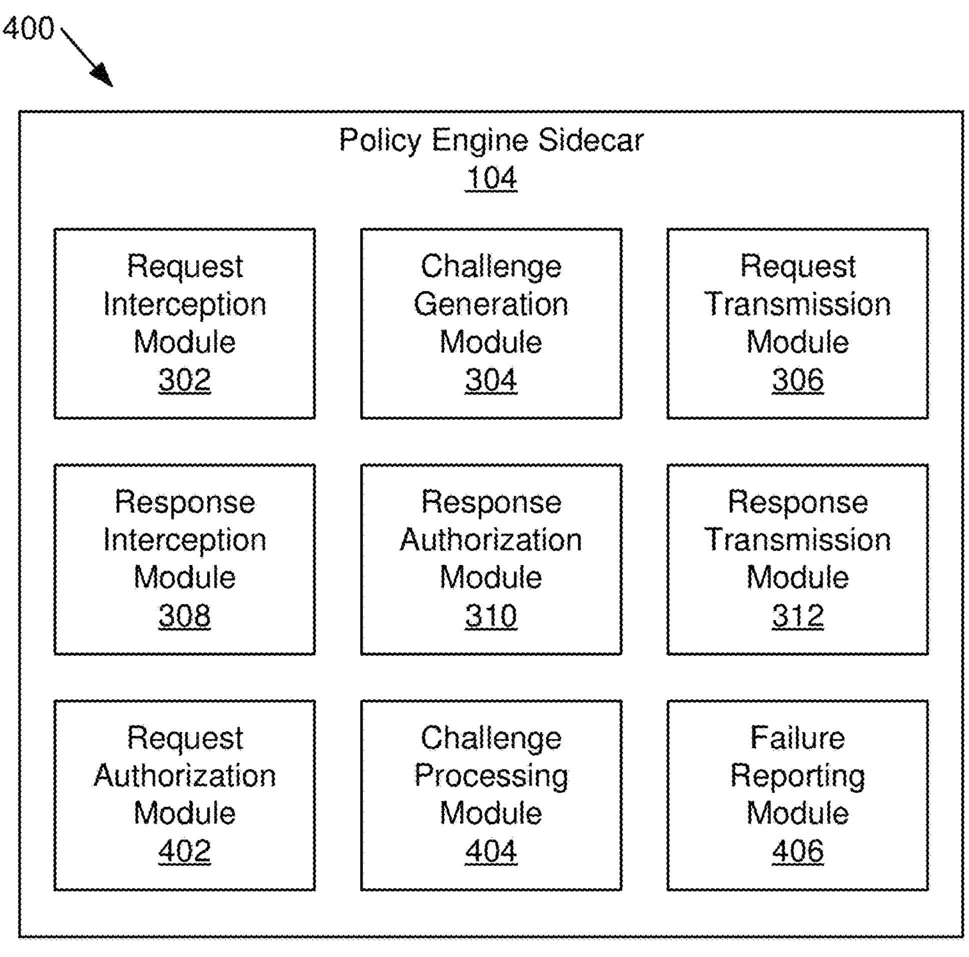
FIG. 4 is a schematic block diagram illustrating another apparatus for microservice authentication in a zero trust architecture, according to various embodiments.

FIG. 4 is a schematic block diagram illustrating another apparatus 400 for microservice authentication in a zero trust architecture, according to various embodiments. The apparatus 400 includes a policy engine sidecar 104 with a request interception module 302, a challenge generation module 304, a request transmission module 306, a response interception module 308, a response authorization module 310, and a response transmission module 312, which are substantially similar to those described above in relation to the apparatus 300 of FIG. 3. The policy engine sidecar 104 includes, in various embodiments, a request authorization module 402, a challenge processing module 404, and/or a failure reporting module 406, which are described below. In various embodiments, all or a portion of the apparatus 400 is implemented similar to the apparatus 300 of FIG. 3.

In some embodiments, the first policy engine sidecar 104*a* and the second policy engine sidecar 104*b* are configured for intercepting and processing service requests from the attached microservice 102 and intercepting and processing service request responses from another microservice 102 as well as intercepting and processing service requests from other microservices 102. In some embodiments, the apparatus 400 includes a request authorization module 402 configured to, in response to receiving the service request from another microservice 102, authenticate the microservice 102 sending the service request using a received token and information received from the central policy server 108 regarding the microservice 102 transmitting the service request. Where the policy engine sidecar 104 is the second policy engine sidecar 104*b*, the request authorization module 402 is configured to, in response to the second microservice 102*b* receiving the service request from the first microservice 102*a*, the second policy engine sidecar 104*b* intercepts the service request and authenticates the first microservice 102*a* using the first token and information received from the central policy server 108 regarding the first microservice 102*a*. In some embodiments, the request authorization module 402 decrypts or unlocks the first token using a password, encryption key, or the like prior to evaluating contents of the first token. In some embodiments, the request authorization module 402 determines if a serial number, MAC address, or other identifier of the first microservice 102*a* matches information about the first microservice 102*a* from the central policy server 108.

In some embodiments, the request authorization module 402 is further configured to determine whether the first microservice 102*a* is authorized to request services of the service request using the information received from the central policy server 108 regarding the first microservice 102*a*. In some examples, the request authorization module 402 compares services provided by the second microservice 102*b* with the requested services to determine whether the second microservice 102*b* is capable of providing the requested services of the service request. Where the request authorization module 402 determines that a service of the service request is not offered by the second microservice 102*b*, the request authorization module 402 determines that the service is not authorized. In other embodiments, the request authorization module 402 determining whether the first microservice 102*a* is authorized to request the services of the service request includes the request authorization module 402 determining whether the first microservice 102*a* has permission to access services provided by the second microservice 102*b*. For example, the second microservice 102*b* may offer a service but the first microservice 102*a* is not permitted to access the service from the second microservice 102*b* so the request authorization module 402 determines that the service of the service request is not authorized. Where the request authorization module 402 determines that a service of the service request is provided by the second microservice 102*b* and that the first microservice 102*a* is permitted to request the service, the request authorization module 402 authorizes the service.

In some embodiments, the apparatus 400 includes a challenge processing module 404 configured to process the transaction challenge. In some embodiments, the challenge processing module 404 processes the transaction challenge by signing the transaction challenge to form a transaction challenge response. In some embodiments, the challenge processing module 404 processes the transaction challenge by providing information about the request authorization module 402 authenticating the first microservice 102 to form a transaction challenge response. In other embodiments, the challenge processing module 404 processes the transaction challenge by providing details about the request authorization module 402 authorizing the services of the service request to form a transaction challenge response.

In other embodiments, the challenge processing module 404 processes the transaction challenge by responding to a query of the transaction challenge to form a transaction challenge response. In some embodiments, the challenge processing module 404 forms a transaction challenge response by combining a response to a query of the transaction challenge, transaction details from an authorization of the services of the service request, transaction details from authentication of the first microservice 102*a*, signing the transaction challenge, or any combination thereof. In some embodiments, the challenge processing module 404 encrypts the transaction challenge response to form and encrypted transaction object, which is decrypted by a response interception module 308 or a response authorization module 310 of another microservice's policy engine sidecar 104 transmitting the service request and receiving a corresponding service request response. In some embodiments, functions of the request authorization module 402 and challenge processing module 404 are described in relation to FIGS. 2E-2G.

In some embodiments, the response transmission module 312 is further configured to transmit the service request to the associated microservice 102 in response to the request authorization module 402 authenticating the microservice 102 transmitting the service request and authorizing the services of the service request. Upon receipt of the service request, the associated microservice 102 (e.g., second microservice 102*b* in FIGS. 2E-2G) responds to the service request to form the service request response. Responding to the service request, in some embodiments, includes the associated microservice 102 (e.g., second microservice 102*b* in FIGS. 2E-2G) executing an application of the microservice 102 based on information from the service request.

In some embodiments, the apparatus 400 includes a failure reporting module 406 of the first policy engine sidecar 104*a* configured to report a service request failure to the first microservice 102*a* in response to determining that the second token is not valid, the service request response does not include a token from the second microservice 102*b*, the transaction challenge response includes an unacceptable response to the transaction challenge, and/or the service request response does not include the transaction challenge response. In other embodiments, the second policy engine sidecar 104*b* includes a failure reporting module 406 configured to report a service request failure to the second microservice 102*b* in response to the request authorization module 402 failing to authenticate the first microservice 102*a* and/or failing to authorize the services of the service request.

In other embodiments, at least the response authorization module 310, the request authorization module 402, and the failure reporting module 406 of the policy engine sidecars 104 record metadata of transactions, which may then be transmitted the central policy server 108, analyzed, etc. In other embodiments, the policy engine sidecars 104 record other information related to the transactions.

Figure 5:
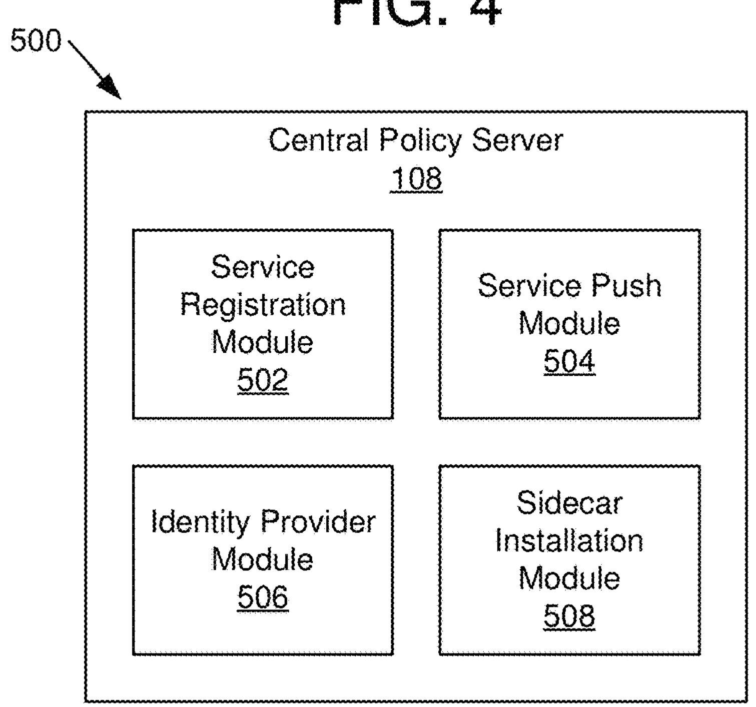
FIG. 5 is a schematic block diagram illustrating an apparatus for a central policy server for microservice authentication in a zero trust architecture, according to various embodiments.

FIG. 5 is a schematic block diagram illustrating an apparatus 500 for a central policy server for microservice authentication in a zero trust architecture, according to various embodiments. The apparatus 500 includes a central policy server 108 that includes a service registration module 502, a service push module 504, an identity provider module 506, and/or a sidecar installation module 508, which are described below. In various embodiments, all or a portion of the apparatus 500 is implemented similar to the apparatus 300 of FIG. 3.

The apparatus 500, in some embodiments, includes a service registration module 502 configured to register microservices 102, which allows the microservices 102 to include a policy engine sidecar 104 and to communicate with the central policy server 108. Advantageously, the microservices 102 registering with the central policy server 108 provides a way in a zero trust architecture to authenticate microservices 102 sending and receiving service requests and other communications. The service registration module 502, in some embodiments, registers the a microservice 102 by recording services provided by the microservice 102 and permissions required before the microservice 102 will provide a service. In some embodiments, the service registration module 502 stores the services and permissions and updates the services and permissions as necessary. In other embodiments, the service registration module 502 records an identifier for the microservice 102, such as a serial number, a MAC address, a IP address, and the like.

The apparatus 500, in various embodiments, includes a service push module 504 configured to push services, permissions, and an identifier of a microservice (e.g., 102*a*) to other microservices (e.g., 102*b*-102*n*) of microservices 102 registered with the central policy server 108. In other embodiments, the service push module 504 sends updates of services and/or permissions to policy engine sidecars 104 as needed when services and/or permissions are updated. In addition, the service push module 504, in some embodiments, directs the policy engine sidecars 104 to delete services, permissions, and an identifier of a microservice 102 that is not functional, that has been removed, that has errors, or the like.

In various embodiments, the apparatus 500 includes an identity provider module 506 configured to configure each microservice 102 and/or associated policy engine sidecar 104 with a token where the token identifies the microservice 102. In some embodiments, the identity provider module 506 occasionally or periodically updates the token of a microservice 102. As used herein the identity provider described above includes the functions of the identity provider module 506.

In some embodiments, the apparatus 500 includes a sidecar installation module 508 configured to install a policy engine sidecar 104 for a newly registered microservice 102. In some embodiments, installing a policy engine sidecar 104 includes transmitting code to the microservice 102 that includes the policy engine sidecar 104 or that includes a link to download and/or install software of the policy engine sidecar 104. One of skill in the art will recognize other ways for the sidecar installation module 508 to install a policy engine sidecar 104 to be used by a microservice 102.

Figure 6:
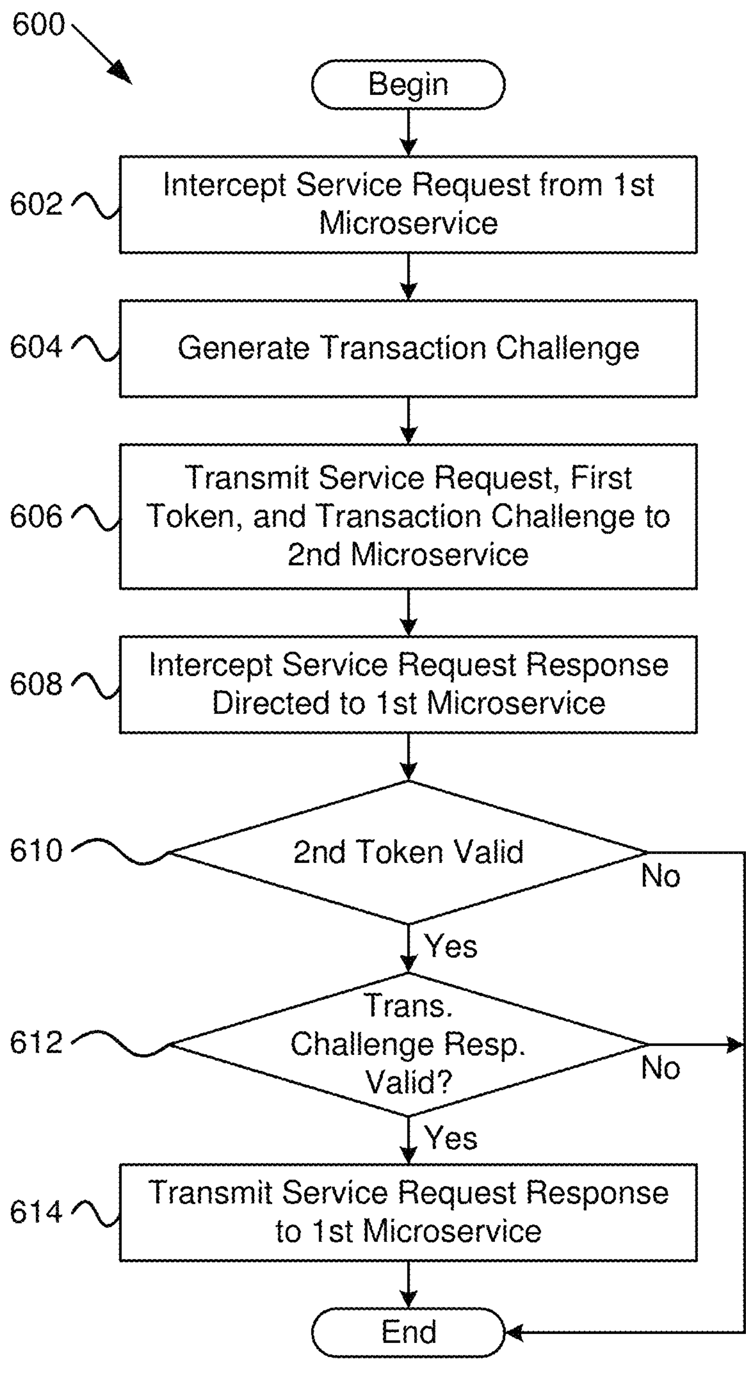
FIG. 6 is a schematic flow chart diagram illustrating a method for microservice authentication in a zero trust architecture, according to various embodiments.

FIG. 6 is a schematic flow chart diagram illustrating a method 600 for microservice authentication in a zero trust architecture, according to various embodiments. The method 600 is from the perspective of the first policy engine sidecar 104*a*. The method 600 begins and intercepts 602, at the first policy engine sidecar 104*a* of a first microservice 102*a*, a service request from the first microservice 102*a* to a second microservice 102*b*. The service request includes services requested from the second microservice 102*b*. The method 600 generates 604, at the first policy engine sidecar 104*a*, a transaction challenge and transmits 606 the service request, a first token identifying the first microservice 102*a*, and the transaction challenge to the second microservice 102*b*.

The method 600 intercepts 608 a service request response from the second microservice 102*b* to the first microservice 102*a* and determines 610 whether the service request response includes a second token to identify the second microservice 102*b* and that the second token is valid. In some embodiments, the method 600 compares information from the central policy server 108 with information from the second token about the second microservice 102*b* to determine if the second token is valid. If the method 600 determines 610 that the service request response includes a second token that is valid, the method 600 determines 612 if the service request response includes a transaction challenge response generated by a second policy engine sidecar 104*b* of the second microservice 102*b* that is valid and/or acceptable. In some embodiments, the method 600 determines 612 that the transaction challenge response is valid and/or acceptable by determining if the transaction challenge response has been signed, is responsive to the transaction challenge, or the like. In some embodiments, the transaction challenge response is an encrypted transaction object and the method 600 decrypts the encrypted transaction object prior to determining 612 validity of the transaction challenge response.

If the method 600 determines 612 that the service request response includes a transaction challenge response that is valid and/or acceptable, the method 600 transmits 614 the service request response to the first microservice 102*a*, and the method 600 ends. If the method 600 determines 610 that the second token is not valid or is non-existent or if the method 600 determines 612 that the transaction challenge response is non-existent or is invalid, the method 600 ends. In various embodiments, all or a portion of the method 600 is implemented using the request interception module 302, the challenge generation module 304, the request transmission module 306, the response interception module 308, the response authorization module 310, and/or the response transmission module 312.

Figure 7:
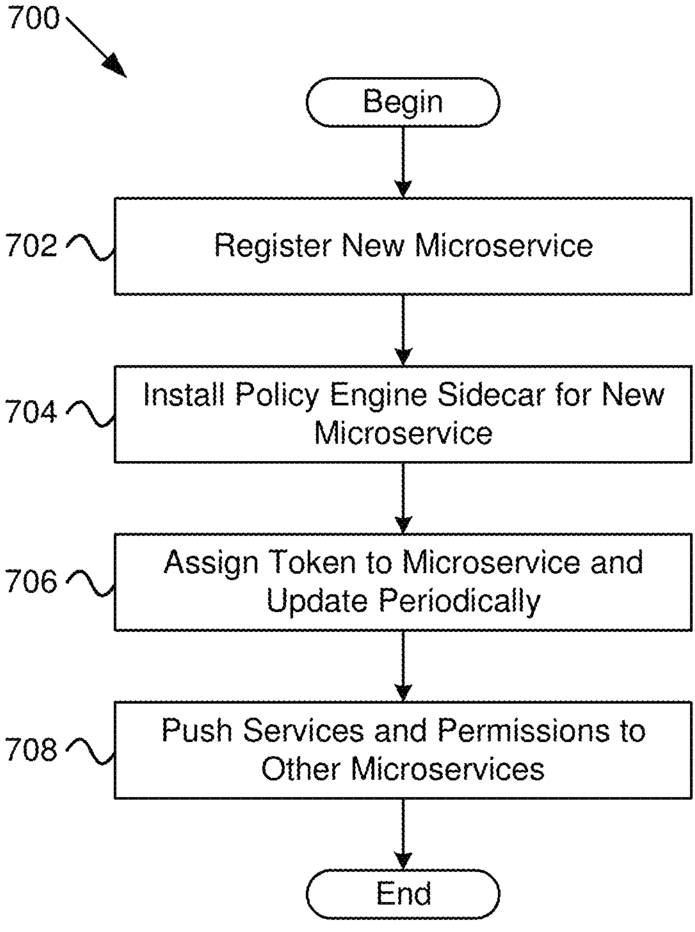
FIG. 7 is a schematic flow chart diagram illustrating a method for registering microservices at a central policy server, according to various embodiments.

FIG. 7 is a schematic flow chart diagram illustrating a method 700 for registering microservices at a central policy server 108, according to various embodiments. The method 700 begins and registers 702 a new microservice 102 with the central policy server 108. Registering 702 the microservice 102 with the central policy server 108, in some embodiments, includes identifying services provided by the microservice 102 and/or permissions required by the microservice 102. The method 700 installs 704 a policy engine sidecar 104 for the new microservice 102 and assigns 706 a token to the microservice 102 and periodically updates the token. The method 700 pushes 708 services, permissions, identifying information, etc. of the new microservice 102 to other registered microservices 102, and the method 700 ends. In various embodiments, all or a portion of the method 700 is implemented using the service registration module 502, the service push module 504, the identity provider module 506, and/or the sidecar installation module 508.

Figure 8:
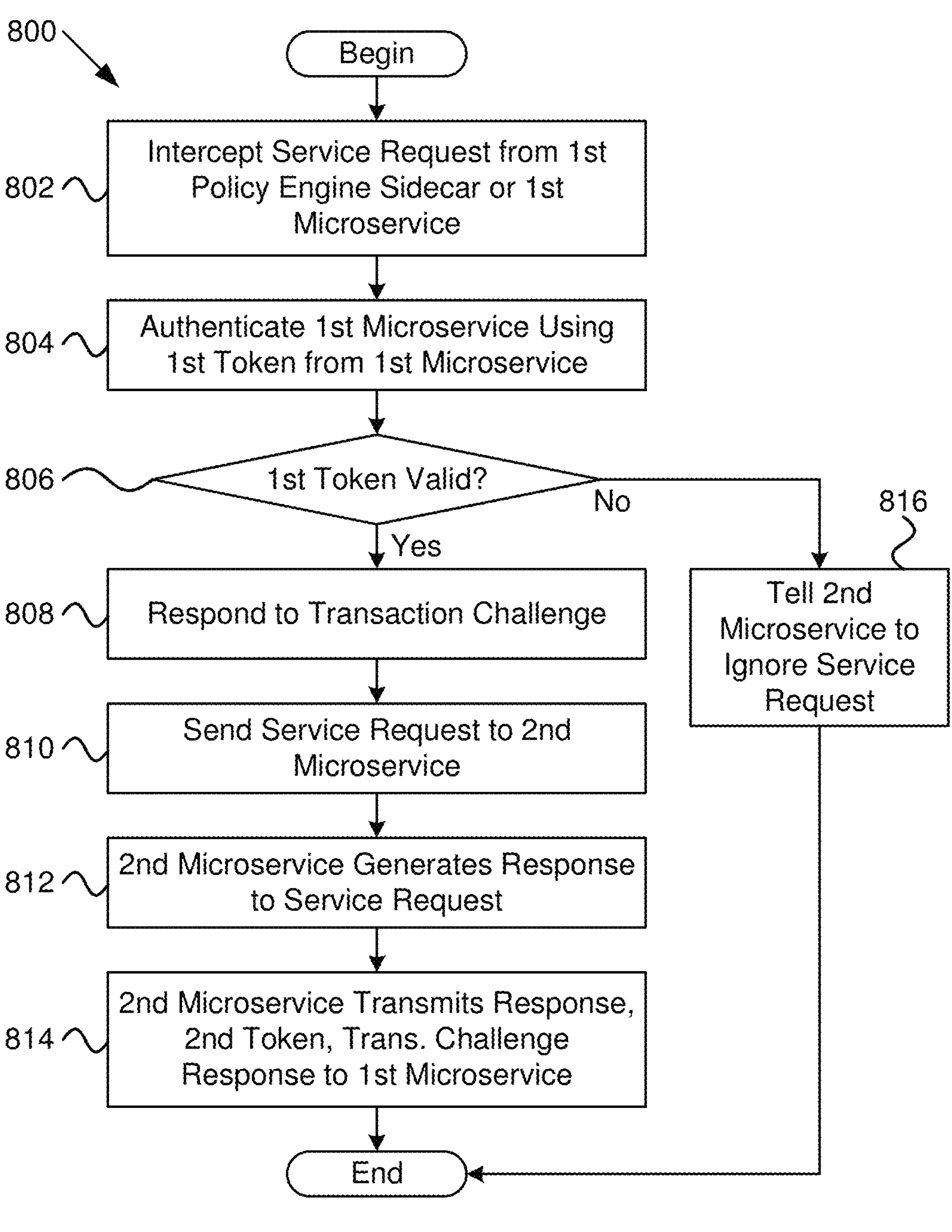
FIG. 8 is a schematic flow chart diagram illustrating a method for receiving and processing a service request at a second policy engine sidecar, according to various embodiments.

FIG. 8 is a schematic flow chart diagram illustrating a method 800 for receiving and processing a service request at a second policy engine sidecar 104*b*, according to various embodiments. The method 800 is mostly from the perspective of the second policy engine sidecar 104*b* receiving a service request. The method 800 begins and intercepts 802 a service request from the first microservice 102*a* and/or the first policy engine sidecar 104*a* and authenticates 804 the first microservice 102*a* using a first token from the first microservice 102*a*. If the method 800 determines 806 if the first token is valid.

If the method 800 determines 806 that the first token is valid, the method 800 responds 808 to the transaction challenge and creates a transaction challenge response. Responding 808 to the transaction challenge, in various embodiments includes signing the transaction challenge, adding authentication transaction details, responding to a query, or the like. The method 800 sends 810, from the second policy engine sidecar 104*b*, the service request to the second microservice along with the transaction challenge response. In some embodiments, the method 800 encrypts the transaction challenge response creating an encrypted transaction object, which is sent 810 with the service request. In some embodiments, the method 800 decrypts the service request prior to sending 810 the service request to the second microservice 102*b*.

The second microservice 102*b* responds to the service request and generates 812 a service request response. The second microservice 102*b* and/or the second policy engine sidecar 104*b* transmits 814 the service request response, the transaction challenge response, and a second token to the first microservice 102*a*, and the method 800 ends. In some embodiments, the method 800 encrypts the service request response before transmission 814. In some embodiments, the transaction challenge response is in the form of an encrypted transaction object, which is transmitted with the service request response and the second token. The second token identifies the second microservice 102*b*. If the method 800 determines 806 that the first token is invalid or non-existent, in some embodiments, the method 800 tells 816 to the second microservice 102*b* to ignore the service request, and the method 800 ends. In other embodiments, if the method 800 determines 806 that the first token is invalid or non-existent, the method 800 ignores the service request, and the method 800 ends. In various embodiments, all or a portion of the method 800 is implemented using the request interception module 302, the challenge generation module 304, the request transmission module 306, the response interception module 308, the response authorization module 310, the response transmission module 312, the request authorization module 402, the challenge processing module 404, and/or the failure reporting module 406.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

intercepting, at a first policy engine sidecar of a first microservice, a service request from the first microservice to a second microservice, the service request comprising services requested from the second microservice;

generating, at the first policy engine sidecar, a transaction challenge;

transmitting the service request, a first token identifying the first microservice, and the transaction challenge to the second microservice;

intercepting a service request response from the second microservice to the first microservice;

determining whether the service request response comprises a second token to identify the second microservice and checking validity of a transaction challenge response generated by a second policy engine sidecar of the second microservice; and transmitting the service request response to the first microservice in response to determining that the second token identifies the second microservice and in response to determining that the transaction challenge response to the transaction challenge is valid.

2. The method of claim 1, wherein in response to receiving the service request from the first microservice, the second policy engine sidecar authenticates the first microservice using the first token and information received from a central policy server regarding the first microservice.

3. The method of claim 2, wherein the second policy engine sidecar further determines whether the first microservice is authorized to request services of the service request using the information received from the central policy server regarding the first microservice.

4. The method of claim 3, wherein determining whether the first microservice is authorized to request the services of the service request comprises determining whether the first microservice has permission to access services provided by the second microservice.

5. The method of claim 1, wherein in response to receiving the service request response from the second microservice, the first policy engine sidecar authenticates the second microservice using the second token and information received from a central policy server regarding the second microservice.

6. The method of claim 1, the second policy engine sidecar generates the transaction challenge response in response to authenticating the first microservice using the first token, the transaction challenge response comprising transaction details corresponding to the authentication of the first microservice by the second policy engine sidecar.

7. The method of claim 1, further comprising the first policy engine sidecar reporting a service request failure to the first microservice in response to determining that the second token is not valid, the service request response does not include a token from the second microservice, the transaction challenge response comprises an unacceptable response to the transaction challenge, and/or the service request response does not include the transaction challenge response.

8. The method of claim 1, further comprising registering a plurality of microservices with a central policy server, wherein registration of the plurality of microservices with the central policy server comprises each of the plurality of microservices declaring services provided and permissions to use the services of the microservice, wherein the first microservice and/or the second microservice are microservices of the plurality of microservices.

9. The method of claim 8, wherein the central policy server further publishes the services of each of the plurality of microservices and permissions required by each of the plurality of microservices to each of the plurality of microservices.

10. The method of claim 8, wherein an identifier provider of the central policy server establishes the first token at the first microservice and/or the second token at the second microservice; and/or the central policy server installs and/or communicates with the first policy engine sidecar and/or the second policy engine sidecar.

11. An apparatus comprising:

a processor; and non-transitory computer readable storage media storing code, the code being executable by the processor to perform operations comprising:

intercepting, at a first policy engine sidecar of a first microservice, a service request from the first microservice to a second microservice, the service request comprising services requested from the second microservice;

generating, at the first policy engine sidecar, a transaction challenge;

transmitting the service request, a first token identifying the first microservice, and the transaction challenge to the second microservice;

intercepting a service request response from the second microservice to the first microservice;

determining whether the service request response comprises a second token to identify the second microservice and checking validity of a transaction challenge response generated by a second policy engine sidecar of the second microservice; and transmitting the service request response to the first microservice in response to determining that the second token identifies the second microservice and in response to determining that the transaction challenge response to the transaction challenge is valid.

12. The apparatus of claim 11, wherein in response to receiving the service request from the first microservice, the second policy engine sidecar authenticates the first microservice using the first token and information received from a central policy server regarding the first microservice.

13. The apparatus of claim 12, wherein the second policy engine sidecar further determines whether the first microservice is authorized to request services of the service request using the information received from the central policy server regarding the first microservice.

14. The apparatus of claim 13, wherein determining whether the first microservice is authorized to request the services of the service request comprises determining whether the first microservice has permission to access services provided by the second microservice.

15. The apparatus of claim 11, wherein in response to receiving the service request response from the second microservice, the first policy engine sidecar authenticates the second microservice using the second token and information received from a central policy server regarding the second microservice.

16. The apparatus of claim 11, the second policy engine sidecar generates the transaction challenge response in response to authenticating the first microservice using the first token, the transaction challenge response comprising transaction details corresponding to the authentication of the first microservice by the second policy engine sidecar.

17. The apparatus of claim 11, wherein the operations further comprise the first policy engine sidecar reporting a service request failure to the first microservice in response to determining that the second token is not valid, the service request response does not include a token from the second microservice, the transaction challenge response comprises an unacceptable response to the transaction challenge, and/or the service request response does not include the transaction challenge response.

18. The apparatus of claim 11, wherein the operations further comprise registering a plurality of microservices with a central policy server, wherein registration of the plurality of microservices with the central policy server comprises each of the plurality of microservices declaring services provided and permissions to use the services of the microservice, wherein the first microservice and/or the second microservice are microservices of the plurality of microservices.

19. The apparatus of claim 18, wherein:

the central policy server further publishes the services of each of the plurality of microservices and permissions required by each of the plurality of microservices to each of the plurality of microservices;

an identifier provider of the central policy server establishes the first token at the first microservice and/or the second token at the second microservice; and/or the central policy server installs and/or communicates with the first policy engine sidecar and/or the second policy engine sidecar.

20. A program product comprising a non-transitory computer readable storage medium storing code, the code being configured to be executable by a processor to perform operations comprising:

intercepting, at a first policy engine sidecar of a first microservice, a service request from the first microservice to a second microservice, the service request comprising services requested from the second microservice;

generating, at the first policy engine sidecar, a transaction challenge;

transmitting the service request, a first token identifying the first microservice, and the transaction challenge to the second microservice;

intercepting a service request response from the second microservice to the first microservice;

determining whether the service request response comprises a second token to identify the second microservice and checking validity of a transaction challenge response generated by a second policy engine sidecar of the second microservice; and transmitting the service request response to the first microservice in response to determining that the second token identifies the second microservice and in response to determining that the transaction challenge response to the transaction challenge is valid.

* * * * *